US008427662B2

(12) United States Patent
Asakimori et al.

(10) Patent No.: US 8,427,662 B2
(45) Date of Patent: Apr. 23, 2013

(54) IMAGE FORMING APPARATUS CAPABLE OF MANAGING CONFIGURATION INFORMATION OF MULTIPLE MODULES

(75) Inventors: Hiroki Asakimori, Saitama (JP); Junji Ukegawa, Kanagawa (JP); Takashi Soyama, Tokyo (JP); Ken Norota, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1300 days.

(21) Appl. No.: 11/783,982

(22) Filed: Apr. 13, 2007

(65) Prior Publication Data
US 2007/0283253 A1    Dec. 6, 2007

(30) Foreign Application Priority Data

Apr. 26, 2006  (JP) ................................. 2006-122125
Mar. 22, 2007  (JP) ................................. 2007-075193

(51) Int. Cl.
*G06K 15/00* (2006.01)
(52) U.S. Cl.
USPC ......... 358/1.14; 358/1.1; 358/1.13; 358/1.15; 358/1.16; 726/16; 726/17; 726/18; 726/19; 726/20; 726/26; 726/27
(58) Field of Classification Search ................ 358/1.13, 358/1.14, 1.15, 1.16; 726/16–20, 26, 27
See application file for complete search history.

(56) References Cited

U.S. PATENT DOCUMENTS

| | | | |
|---|---|---|---|
| 6,948,866 B2* | 9/2005 | Okochi | 400/76 |
| 7,633,644 B2* | 12/2009 | Lum et al. | 358/1.16 |
| 7,669,196 B2* | 2/2010 | Takizawa | 717/170 |
| 7,860,239 B2* | 12/2010 | Cerri et al. | 380/26 |
| 2002/0140966 A1* | 10/2002 | Meade et al. | 358/1.15 |
| 2004/0075857 A1* | 4/2004 | Akiyoshi et al. | 358/1.13 |
| 2004/0128532 A1* | 7/2004 | Ohishi et al. | 713/200 |
| 2004/0239975 A1* | 12/2004 | Kawaura et al. | 358/1.14 |
| 2005/0120242 A1* | 6/2005 | Mayer et al. | 713/201 |
| 2005/0216748 A1* | 9/2005 | Yeung et al. | 713/187 |
| 2005/0268104 A1* | 12/2005 | Sugishita et al. | 713/176 |
| 2006/0077425 A1* | 4/2006 | Nakata et al. | 358/1.15 |
| 2006/0077454 A1* | 4/2006 | Lum et al. | 358/1.15 |
| 2006/0170953 A1* | 8/2006 | Okamoto et al. | 358/1.15 |
| 2006/0176507 A1* | 8/2006 | Kobayashi et al. | 358/1.15 |

FOREIGN PATENT DOCUMENTS

| | | |
|---|---|---|
| JP | 2004-165734 | 6/2004 |
| JP | 2004-318838 | 11/2004 |
| JP | 2004-318871 | 11/2004 |
| WO | WO 02/01351 | 1/2002 |

\* cited by examiner

*Primary Examiner* — Benjamin O Dulaney
(74) *Attorney, Agent, or Firm* — Harness, Dickey & Pierce, P.L.C.

(57) ABSTRACT

An image forming apparatus is disclosed that includes multiple application modules configured to perform image processing including scanning, printing, and copying of an image; multiple service modules configured to perform an image forming operation and to control the image forming apparatus; a nonvolatile configuration information storage part configured to contain first configuration information of the application modules and the service modules; a configuration information comparison part configured to read second configuration information of the application modules and the service modules and compare the first configuration information and the second configuration information before starting the application modules and the service modules; and a notification part configured to notify the manager of the image forming apparatus of the difference between the first configuration information and the second configuration information in response to detection of the difference.

21 Claims, 9 Drawing Sheets

(a) PREVIOUS

| MODULE ID | NAME | PART NO. | VERSION |
|---|---|---|---|
| ***_System | System | B0001 | 1.00 |
| ***_Copy | Copy | B0002 | 1.01 |
| ***_Fax | Fax | B0003 | 2.00 |
| ***_Scan | Scanner | B004 | 3.00 |

(b) CURRENT

| MODULE ID | NAME | PART NO. | VERSION |
|---|---|---|---|
| ***_System | System | B0001 | 1.20 |
| ***_Copy | Copy | B0002 | 1.01 |
| ***_Fax | Fax | B0003 | 2.00 |
| ***_Scan | Scanner | B004 | 3.00 |

(c) UPDATED

| MODULE ID | NAME | PART NO. | VERSION |
|---|---|---|---|
| ***_System | System | B0001 | 1.20 |
| ***_Copy | Copy | B0002 | 1.01 |
| ***_Fax | Fax | B0003 | 2.00 |
| ***_Scan | Scanner | B004 | 3.00 |

IMAGE FORMING APPARATUS CAPABLE OF MANAGING CONFIGURATION INFORMATION OF MULTIPLE MODULES

BACKGROUND OF THE INVENTION

1. Field of the Invention

The present invention relates generally to image forming apparatuses, and more particularly to an image forming apparatus with increased security against a change in module configuration.

2. Description of the Related Art

Image forming apparatuses with multiple functions such as copying, printing, scanning, and facsimile tend to have more and more functions in order to meet users' requirements. Further, the functions of image forming apparatuses are modularized. Such modularization enables modular-basis apparatus development. Each module operates on corresponding individual firmware, and its operation is controlled by the firmware of a system controller that performs overall control.

In these years, it has been possible to add functions to image forming apparatuses using various media in order to increase the extensibility of firmware or applications of image forming apparatuses brought on the market. For example, it is possible to expand the functions of an image forming apparatus by adding thereto a third-party application not manufactured by the manufacturer of the image forming apparatus. It is also possible to strengthen the security function of the image forming apparatus. Further, it is possible to update the firmware of the image forming apparatus through various media or networks. In the case of occurrence of some kind of trouble, updating a function, or strengthening a security function in such an image forming apparatus, the configuration of the image forming apparatus may be changed by its manager. A description is given below of some examples of the conventional technology related to this.

Japanese Laid-Open Patent Application No. 2004-165734 discloses an image forming apparatus capable of reducing loss of productivity when it is urgently required to update firmware as in the case of occurrence of a problem. The firmware is updated (to a new one) upon detection of occurrence of a problem originating in the firmware. Of control modules such as the control modules of an image reading part and the control modules of an image forming part, a control module to be controlled by the new firmware is determined. The operation of a part to be controlled by the new firmware is stopped, while the other parts are allowed to continue their operations.

Japanese Laid-Open Patent Application No. 2004-318838 discloses a software updating apparatus that reduces the workload of updating while ensuring high security. The firmware of an apparatus to be updated (image forming apparatus) that can communicate with the software updating apparatus (intermediary apparatus) is updated by the software updating apparatus. The intermediary apparatus generates a one-time password, and transmits the generated one-time password to the image forming apparatus through a communications path using SSL so as to have the password stored in the image forming apparatus. Then, the intermediary apparatus transmits the one-time password to the image forming apparatus through a communications path using FTP, whose processing workload is less than that of SSL, so as to have the image forming apparatus perform authentication. If the authenticity is established, the intermediary apparatus transmits firmware for updating to the image forming apparatus through an FTP communications path so as to have the firmware updated. If a successful update is confirmed, the one-time password is nullified.

Japanese Laid-Open Patent Application No. 2004-318871 discloses a communications device. In the case of updating an OS by downloading an OS for updating from an external apparatus such as a managing apparatus, even if the update fails because of power supply interruption, the communications device can determine the failure with ease and certainty at the time of a subsequent restart by turning on power. The CPU of the communications device downloads firmware for updating (rewriting) from the managing apparatus in response to a request to update firmware (including an OS) from the managing apparatus. If the downloading succeeds, a firmware updating flag in a flash ROM is set to "1." At the time of a subsequent startup of the communications device (a startup of a boot loader), the status of the firmware updating flag is checked, and if the flag is "0," the OS and applications in a card memory are successively loaded into a DRAM and started. If the firmware updating flag is "1," the OS and a recovery program in the flash ROM are successively loaded into the DRAM and started.

However, the conventional image forming apparatus has the following problem regarding security. If the configuration of an application module or a service module of an image forming apparatus that has been connected to a network and operating in a secure state is illegally changed, there is a risk that a user may not be able to detect the change and continue to use a vulnerable system. Usually, modules can be changed only by a manager, but it is not impossible to illegally change modules with malicious intent. If the illegal modular change is overlooked, confidential image data may escape through a network.

SUMMARY OF THE INVENTION

Embodiments of the present invention may solve or reduce the above-described problem.

According to one embodiment of the present invention, there is provided an image forming apparatus in which the above-described problem may be solved or reduced.

According to one embodiment of the present invention, there is provided an image forming apparatus in which a change in configuration is prevented from making security vulnerable.

According to one embodiment of the present invention, there is provided an image forming apparatus that has its security increased by preventing serious security vulnerability from being caused and preventing leakage of information due to vulnerability by detecting an illegal change in the module configuration of the image forming apparatus, and notifying a manager of the configuration change and preventing a person (or a user) other than the manager from using the apparatus.

According to one embodiment of the present invention, there is provided an image forming apparatus including a plurality of application modules configured to perform image processing including scanning, printing, and copying of an image; a plurality of service modules configured to perform an image forming operation and to control the image forming apparatus; a nonvolatile configuration information storage part configured to contain first configuration information of the application modules and the service modules; a configuration information comparison part configured to read second configuration information of the application modules and the service modules and compare the first configuration information and the second configuration information before starting the application modules and the service modules; and a notification part configured to notify a manager of the image forming apparatus of a difference between the first configuration information and the second configuration information in response to detection of the difference.

According to one embodiment of the present invention, there is provided an image formation control method including storing first configuration information of a plurality of application modules configured to perform image processing including scanning, printing, and copying of an image and a plurality of service modules configured to perform an image forming operation and to control an image forming apparatus in a nonvolatile configuration information storage part; reading second configuration information of the application modules and the service modules and comparing the first configuration information and the second configuration information before starting the application modules and the service modules; and notifying a manager of the image forming apparatus of a difference between the first configuration information and the second configuration information in response to detection of the difference.

According to one embodiment of the present invention, there is provided a computer-readable recording medium having a program recorded thereon, the program causing a computer to execute the image formation control method as set forth above.

Thus, according to one aspect of the present invention, it is possible to detect an illegal change in module configuration and thus to prevent serious security vulnerability from being caused in an image forming apparatus. Further, it is possible to notify the manager of the image forming apparatus of a change in module configuration, so that it is possible to prevent information leakage due to vulnerability and thus to increase security.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description is given below, with reference to the accompanying drawings, of an embodiment of the present invention.

According to an image forming apparatus of this embodiment, the configuration information of application modules and service modules and the configuration information of all the modules contained in a nonvolatile storage medium are compared at the time of a system startup, and if there is a difference therebetween, a manager is notified of the difference.

Figure 1A:
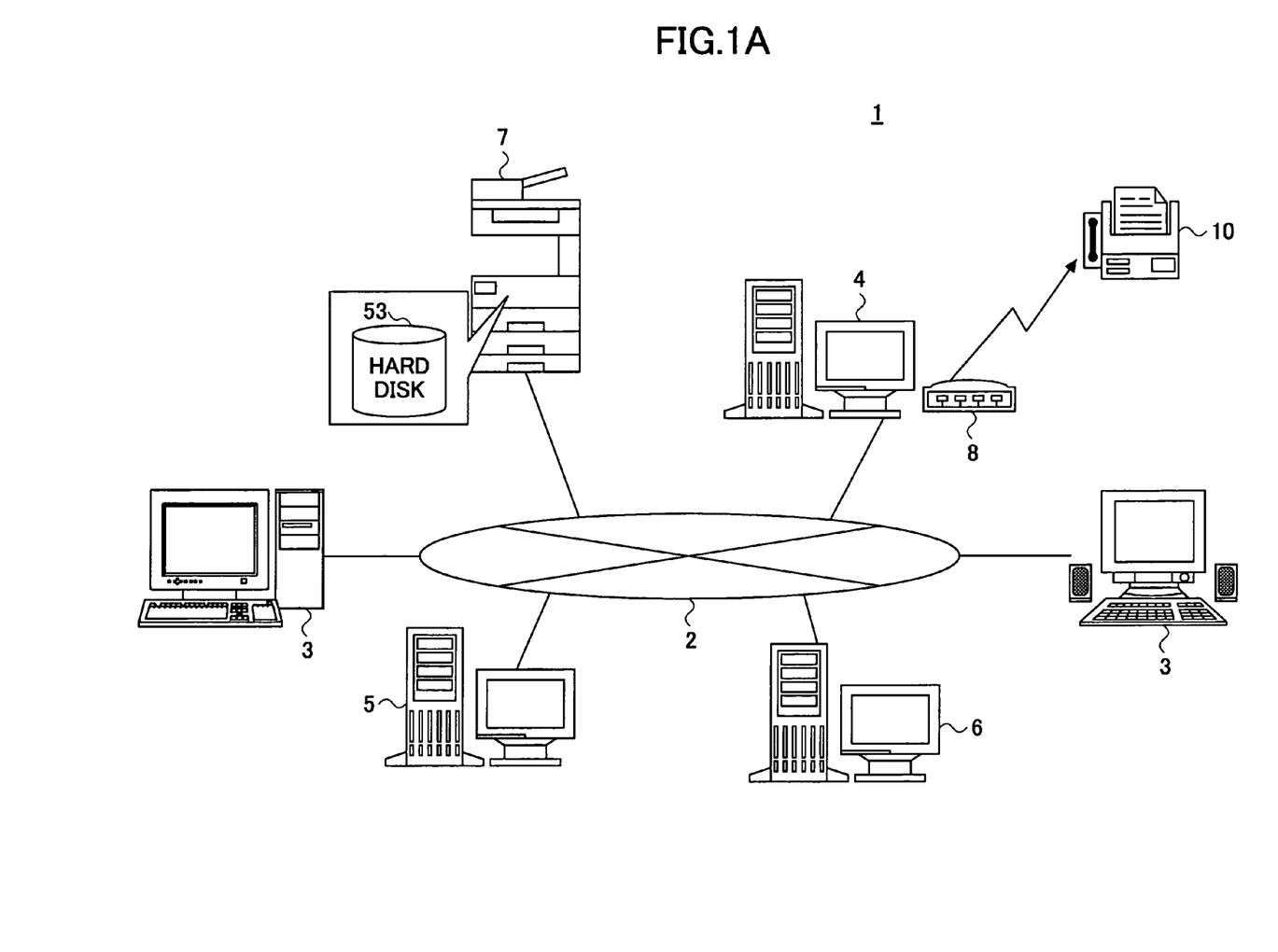
FIG. 1A is a conceptual diagram showing a network system including an image forming apparatus according to an embodiment of the present invention.

FIG. 1A is a diagram showing a network system 1 including an image forming apparatus according to the embodiment of the present invention. The image forming apparatus of this embodiment has the same basic configuration as a conventional image forming apparatus, but is different therefrom with respect to a modular configuration test. Referring to FIG. 1A, the network system 1 includes a network 2 such as the Internet or a LAN (Local Area Network), and multiple client terminals 3 (also referred to collectively as "client terminal 3" for convenience of description), a delivery server 4, an SMTP (Simple Mail Transfer Protocol) server 5, an FTP (File Transfer Protocol) server 6, and multiple image forming apparatuses 7, which are connected to the network 2. In FIG. 1A, only one of the image forming apparatuses 7 is shown for convenience of description, and the image forming apparatuses 7 may be collectively referred to as "the image forming apparatus 7." The delivery server 4 is provided with a modem 8. The delivery server 4 receives facsimile data from the client terminal 3 through the network 2, and transmits the received facsimile data to a facsimile machine 10, which is a communication destination of the delivery server 4, through a telephone line (not graphically illustrated) or the like. Further, the delivery server 4 receives facsimile data from the facsimile machine 10, and transfers the received facsimile data to the client terminal 3 on the network 2.

The SMTP server 5 transmits e-mail to and receives e-mail from the client terminal 3 through the network 2 according to SMTP. The FTP server 6 receives a file transfer request from, for example, the client terminal 3, and transfers a file stored therein in response to the request in accordance with FTP, based on which a transfer command is executed on the network 2. The client terminal 3, for which an ordinary personal computer is used, exchanges facsimile data with the delivery server 4, exchanges e-mail with the SMTP server 5, and exchanges files with the FTP server 6. In particular, the client server 3 transmits a file to the image forming apparatus 7 directly or through the FTP server 6, and causes the image forming apparatus 7 to print the file.

Figure 1B:
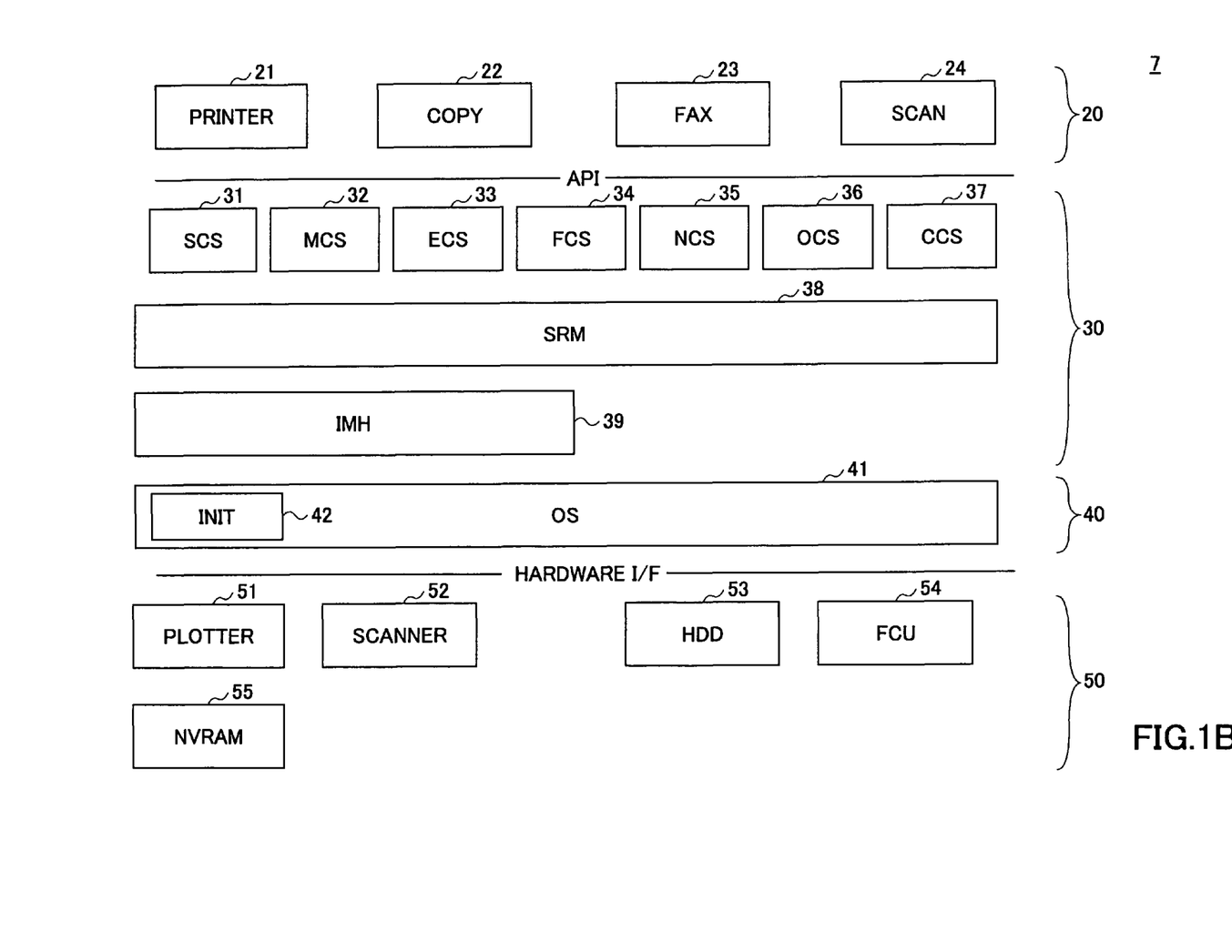
FIG. 1B is a block diagram showing a software configuration of the image forming apparatus according to the embodiment of the present invention.

The image forming apparatus 7 is, for example, an MFP (MultiFunction Peripheral) or a multifunction machine. The image forming apparatus 7 includes a paper feed part, an image forming part, a scanner part, an ADF (Automatic Document Feeder) configured to convey original material such as a document to an image reading position in the scanner part, a facsimile communications function part, and a network communications function part; and implements functions such as a copy function, a facsimile function, a printing function, and a scanning function. FIG. 1B is a block diagram showing a software configuration of the image forming apparatus 7. Referring to FIG. 1B, the image forming apparatus 7 includes an application layer 20, a service layer 30, and a kernel layer 40. The application layer 20 includes a print application 21, a copy application 22, a facsimile (FAX) application 23, and a scan application 24. The print application 21 is a program for printing. The copy application 22 is a program for copying. The facsimile application 23 is a program for facsimile transmission and reception. The scan application 24 is a program for image reading (scanning). Each program of the application layer 20 performs processing using one or more modules of the service layer 30 through an API (Application Programming Interface).

Figure 1C:
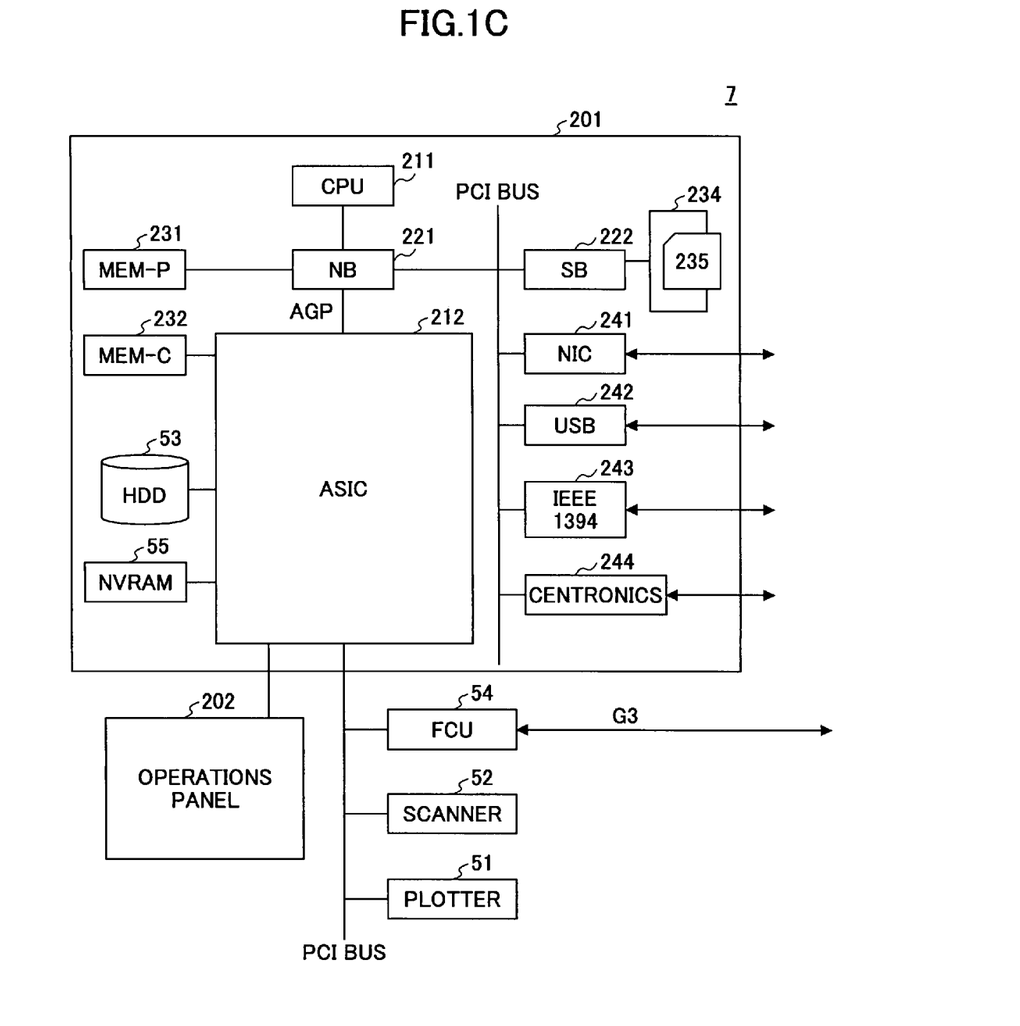
FIG. 1C is a block diagram showing a hardware configuration of the image forming apparatus according to the embodiment of the present invention.

The service layer 30 includes an SCS (System Control Service) 31, an MCS (Memory Control Service) 32, an ECS (Engine Control Service) 33, an FCS (Fax Control Service) 34, an NCS (Network Control Service) 35, an OCS (Operation Control Service) 36, a CCS (Certificate Control Service) 37, an SRM (System Resource Management) 38, and an IMH (Image Memory Handler) 39. The SCS 31 is a module that performs system control. The MCS 32 is a module that performs memory control. The ECS 33 is a module that performs engine control. The FCS 34 is a module that performs facsimile control. The NCS 35 is a module that performs network control. The OCS 36 is a module that controls an operations panel 202 (FIG. 1C). The CCS 37 is a module that causes a user to perform manager authentication. The SRM 38 is a module that manages each system resource. The IMH 39 is a module that handles image memory. The service layer 30 executes the services under the control of the kernel layer 40.

The kernel layer 40 includes an OS (Operating System) 41, which is a core system management program. The OS 41 includes an initializer program (INIT) 42, which performs system initialization. The kernel layer 40 controls hardware 50 through a hardware interface (I/F). The hardware 50 includes a plotter 51, a scanner 52, an HDD (hard disk drive) 53, an FCU (Facsimile Control Unit) 54, and an NVRAM (Nonvolatile RAM) 55. The plotter 51 is a printer. The scanner 52 is an image reader. The HDD 53 is a hard disk unit. The FCU 54 is a device that communicates with a facsimile machine. The NVRAM 55 is a nonvolatile memory for storing, for instance, module configuration information as described below.

FIG. 1C is a block diagram showing a hardware configuration of the image forming apparatus 7. The hardware 50 (FIG. 1B) of the image forming apparatus 7 includes a controller 201, the operations panel 202, the FCU 54, the scanner 52 (image capturing part), and the plotter 51 (printing part). The controller 201 includes a CPU 211, an ASIC 212, an NB (Northbridge) 221, an SB (Southbridge) 222, a system memory (MEM-P) 231, a local memory (MEM-C) 232, the HDD 53, the NVRAM 55, a memory card slot 234, an NIC (Network Interface Controller) 241, a USB device 242, an IEEE 1394 device 243, and a Centronics device 244.

The CPU 211 is an IC for various information processing operations. The CPU 211 controls the image forming apparatus 7. The CPU 211 causes the SCS 31, the MCS 32, the ECS 33, the FCS 34, the NCS 35, the OCS 36, the CCS 37, the SRM 38, and the IMH 39 to be activated as processes on the OS 41 and executed. Further, the CPU 211 causes the printer application 21, the copy application 22, the FAX application 23, and the scan application 24 forming the application layer 20 to be activated and executed.

The ASIC 212 is an IC for various image processing operations. The NB 221, which is a Northbridge of the controller 201, connects the CPU 211, the MEM-P 231, the SB 222, and the ASIC 212. The SB 222, which is a Southbridge of the controller 201, connects the NB 221 to a PCI bus and peripheral devices.

The MEM-P 231 is a system memory of the image forming apparatus 7. The MEM-C 232 is a local memory of the image forming apparatus 7. The HDD 53 is a storage device of the image forming apparatus 7. The NVRAM 55 is a nonvolatile memory as described above. The memory card slot 234 is for loading a memory card 235. The NIC 241 is a controller for network communications based on MAC addresses. The USB device 242 provides a USB-compliant connection terminal. The IEEE 1394 device 243 provides an IEEE 1394-compliant connection terminal. The Centronics device 244 provides a Centronics connection terminal. The SB 222, the NIC 241, the USB device 242, the IEEE 1394 device 243, and the Centronics device 244 are connected to the NB 221 through a PCI bus.

The operations panel 202 is hardware (an operations part) for an operator making input to the image forming apparatus 7, and is also hardware (a display part) for the operator obtaining output from the image forming apparatus 7.

Figure 2A:
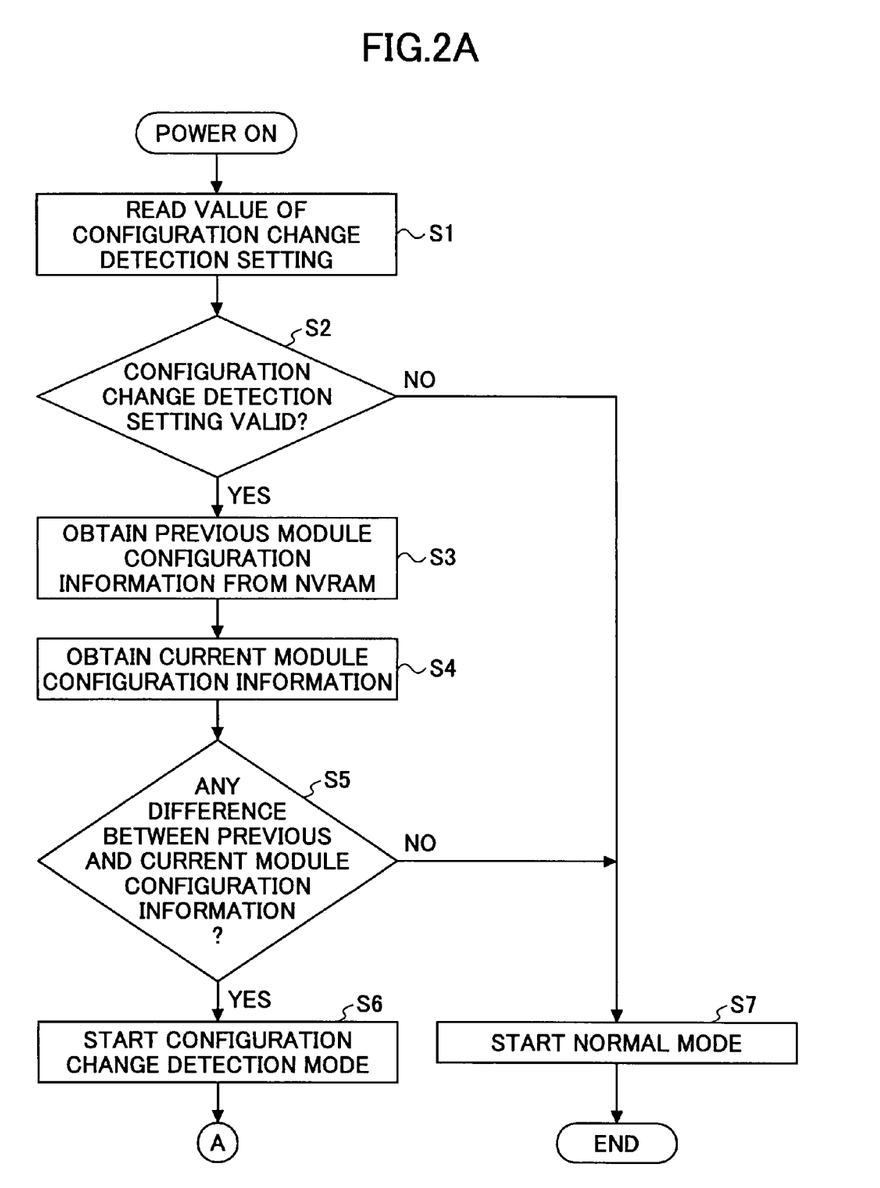
FIGS. 2A and 2B are flowcharts showing an operational procedure of the image forming apparatus according to the embodiment of the present invention.
Figure 2B:
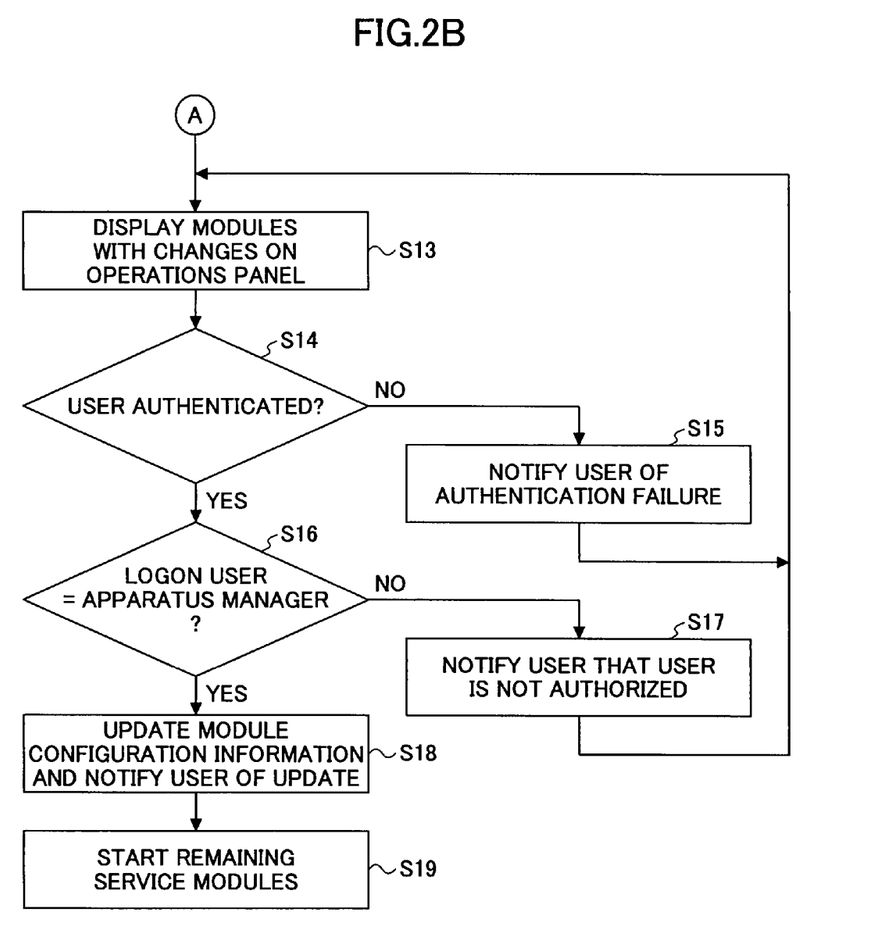
Figure 3:
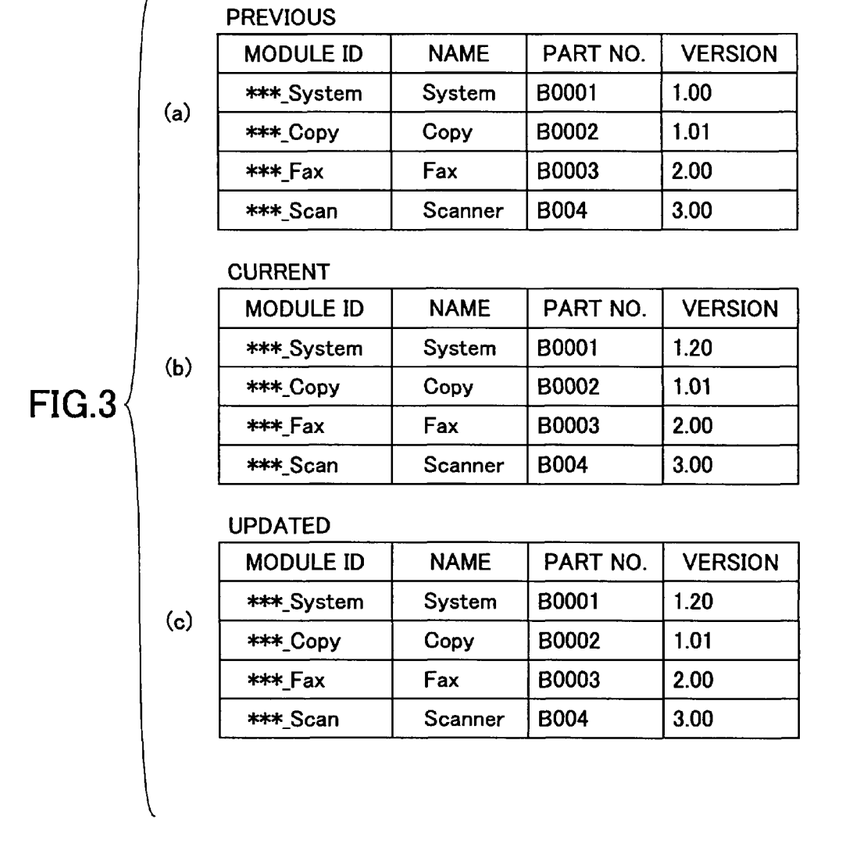
FIG. 3 is a diagram showing updating of a configuration information table of the image forming apparatus according to the embodiment of the present invention.
Figure 4A:
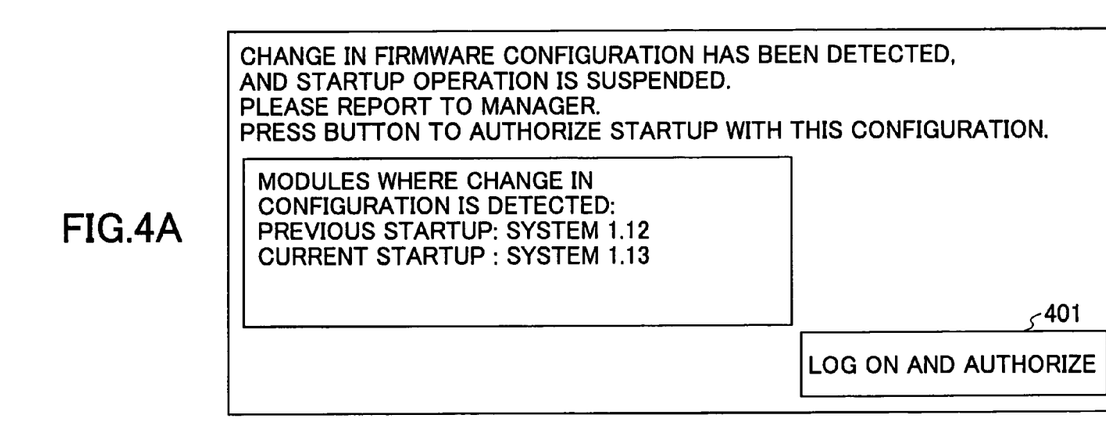
FIG. 4A is a diagram showing a screen that notifies an apparatus manager of a change in module configuration information in the image forming apparatus according to the embodiment of the present invention.
Figure 4B:
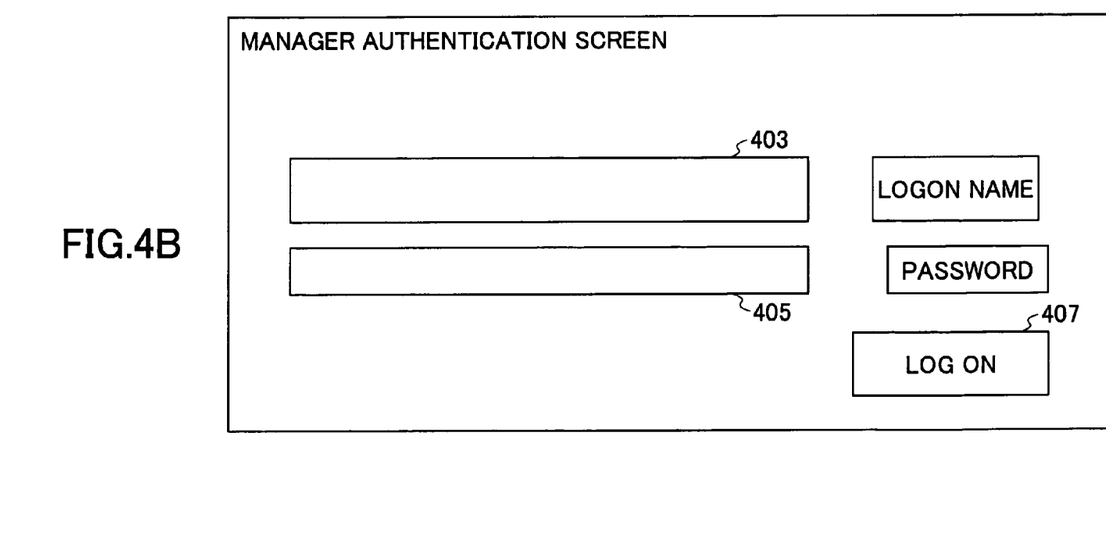
FIG. 4B is a diagram showing a logon screen on which the apparatus manager performs logon in the image forming apparatus according to the embodiment of the present invention.
Figure 4C:
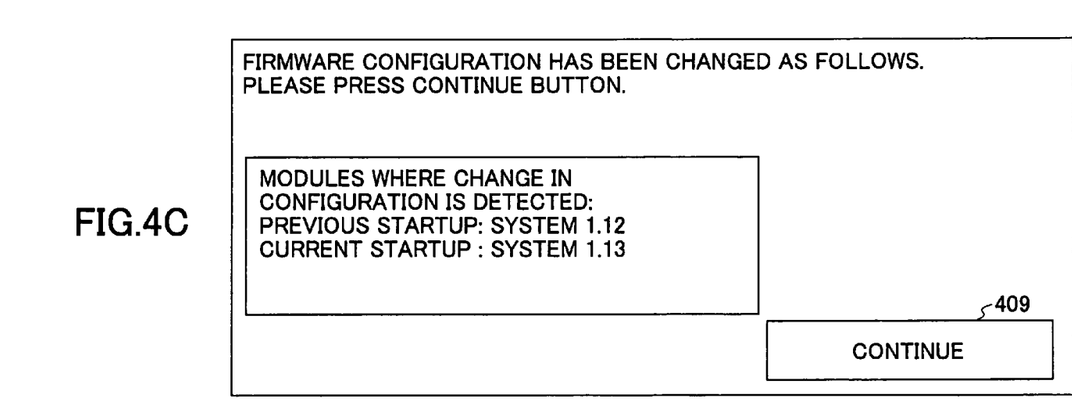
FIG. 4C is a diagram showing a screen that notifies the apparatus manager of proper updating of the module configuration information in the image forming apparatus according to the embodiment of the present invention.
Figure 4D:
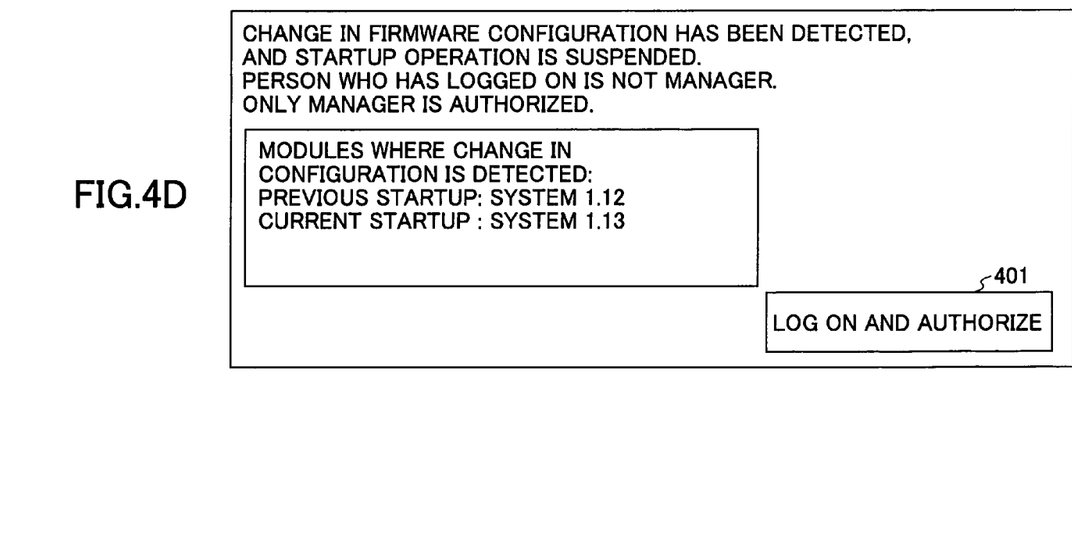
FIG. 4D is a diagram showing that the logon is invalid in the image forming apparatus according to the embodiment of the present invention.
Figure 5:
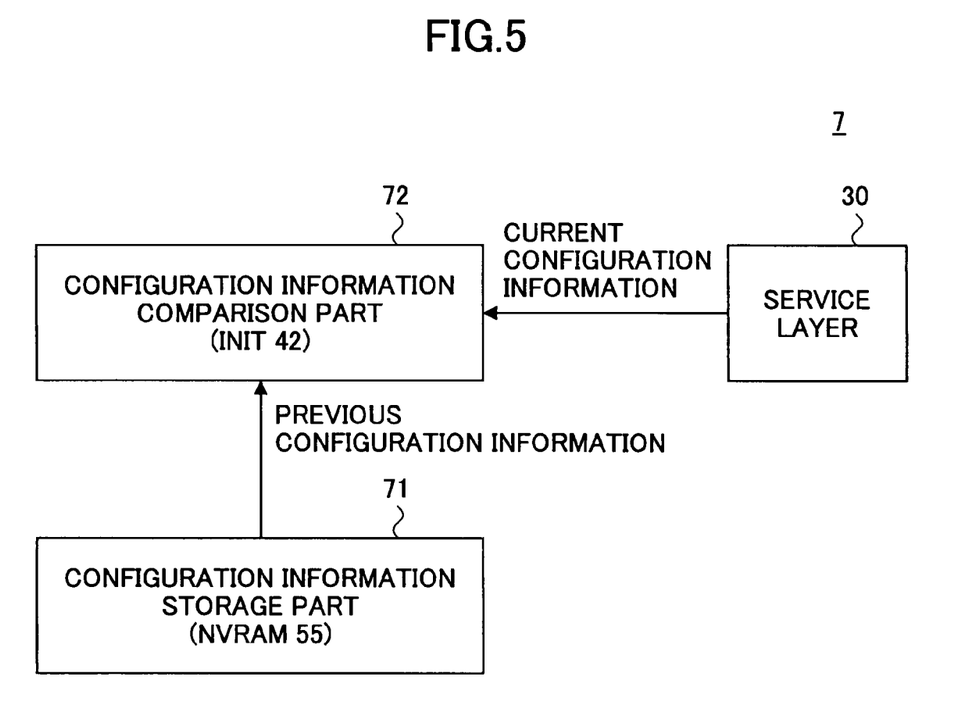
FIG. 5 is a schematic diagram for illustrating functions of the image forming apparatus according to the embodiment of the present invention.

FIGS. 2A and 2B are flowcharts showing an operational procedure of the image forming apparatus 7 according to this embodiment. FIG. 3 is a diagram showing updating of a configuration information table. FIG. 4A is a diagram showing a screen that notifies an apparatus manager of a change in module configuration information. FIG. 4B is a diagram showing a logon screen on which the apparatus manager performs logon. FIG. 4C is a diagram showing a screen that notifies the apparatus manager of proper updating of the module configuration information. FIG. 4D is a diagram showing that the logon is invalid. FIG. 5 is a schematic diagram for illustrating functions of the image forming apparatus 7.

A description is given of functions and operations of the image forming apparatus 7 configured as described above according to the embodiment of the present invention. First, an overview is given, with reference to FIGS. 1A and 1B and FIG. 5, of functions of the image forming apparatus 7. The image forming apparatus 7 includes multiple application modules that perform processing such as scanning, printing, and copying images, and multiple service modules that perform processing such as image forming operations (for example, data processing including storing and transferring images) and controlling the image forming apparatus 7. The image forming apparatus 7 stores the configuration information (module configuration information) of all the application and service modules in a configuration information storage part 71 (FIG. 5) formed of a nonvolatile storage unit such as an NVRAM. Before starting the application modules and service modules, the configuration information of all the modules and the configuration information of all the modules contained in the configuration information storage part are compared in a configuration information comparison part 72 (FIG. 5).

In response to detection of a difference between the two configuration information items, only a module that is necessary for authenticating a manager is started while a module having the difference in configuration information is prevented from being started; then the manager is notified of the difference and requested to be authenticated, thereby preventing a person (or a user) other than the manager from using the image forming apparatus 7. In response to authorization of the change (difference) in configuration by the manager, the module configuration information stored in the configuration information comparison part 72 is updated, and the system is normally booted (started). An authentication request from a person (or a user) other than the manager is rejected, and it is requested that authentication be performed again. A computer program may cause a computer to execute this image formation control method.

Next, a description is given, with reference to FIGS. 2A and 2B, of an operational procedure of the image forming apparatus 7. This operational procedure is under the control of the CPU 211. Referring to FIG. 2A, when power is turned ON, in step S1, the INIT 42 of the OS 41 refers to the NVRAM 55 (configuration information storage part 71) and reads the value of a configuration change detection setting. In step S2, the INIT 42 determines whether the configuration change detection setting is valid. If the configuration change detection setting is not valid (NO in step S2), in step S7, the INIT 42 starts a normal mode, where all the service modules including the SCS 31 are started. Then, this operational procedure ends to wait for a user to use an application.

If the configuration change detection setting is valid (YES in step S2), in step S3, the INIT 42 reads (obtains) the module configuration information of a previous startup (previous module configuration information) from the NVRAM 55. In step S4, the INIT 42 reads (obtains) module configuration information at the time of a current startup (current module configuration information). For example, the INIT 42 obtains (reads) the current module configuration information of the SCS 31 from the SCS 31. The current module configuration information is available as shown in (b) of FIG. 3 without starting the service modules. Then in step S5, the INIT 42 determines whether there is a difference between the previous module configuration information and the current module configuration information. If there is no difference (NO in step S5), in step S7, the INIT 42 starts all the service modules in the normal mode. If there is a difference (change) (YES in step S5), in step S6, the INIT 42 starts a configuration change detection mode, where the SCS 31, the OCS 36, and the CCS 37 are started.

Then, in step S13 of FIG. 2B, the SCS 31 causes the OCS 36 to display one or more modules whose module configuration information has been changed on the operations panel (operations part) 202. Then, in step S14, the SCS 31 causes the CCS 37 to perform logon authentication of a user for manager authentication. If the user is not authenticated (NO in step S14), in step S15, the user is notified of the logon authentication failure. If the user is successfully authenticated, in step S16, the CCS 37 performs manager authentication to determine whether the user who has logged on is the manager of the image forming apparatus 7. If the user who has logged on is not the manager of the image forming apparatus 7 (NO in step S16), in step S17, the user is notified that the user is not authorized. If the user who has logged on is the manager of the image forming apparatus 7, that is, the logon information entered by the user is correct, and the user (manager) operates to authorize the change (YES in step S16), information on this operation is input to the SCS 31, and the SCS 31 detects authorization of the changed configuration. Thus, in step S18, the SCS 31 updates the module configuration information in the NVRAM 55, and causes the OCS 36 to notify the user (manager) of the update. Upon confirmation of the update by the user, the SCS 31 notifies the INIT 42 of authorization of the changed configuration, and in step S19, the INIT 42 starts the other service modules. Here, steps 3 through 6 and 13 through 19 may be referred to as a configuration change detecting operation.

Next, a description is given, with reference to FIG. 3, of a method of updating the configuration information table. In FIG. 3, (a) shows a configuration information table created in step S18 in a previous startup operation, and (b) shows a configuration information table of configuration information obtained in step S4 in the current startup operation. Further, (c) of FIG. 3 shows a configuration information table created in step S18 in the current startup operation. In step S5, the configuration information table shown in (a) of FIG. 3 and the configuration information table shown in (b) of FIG. 3 are compared. In this case, the system version numbers are different. If the authenticity of the manager of the image forming apparatus 7 is established (verified), the configuration information table is updated and stored in the configuration information storage part 71. The configuration information tables may also be compared with respect to items other than the system version number. It is virtually impossible to change even part of a file without being detected because message authentication is performed using the authentication code of the system so as to be able to detect changes in files including the version number. Accordingly, it is impossible for a person (or a user) other than the manager to change the module configuration.

Thus, at the time of a startup, the image forming apparatus 7 extracts the module configuration information of the previous startup stored in a nonvolatile memory, and compares the extracted module configuration information with current module configuration information. In response to detection of a difference between the extracted (previous) module configuration information and the current module configuration information, the image forming apparatus 7 notifies the user of the change (difference) in configuration by displaying it on an operations part, and requests authentication of its manager. Accordingly, a person (or a user) other than the apparatus manager cannot start the image forming apparatus 7 in response to any modular change. Further, unless the apparatus manager authorizes the modular change, a person (or a user) other than the apparatus manager can use the image forming apparatus 7.

Next, a description is given, with reference to FIGS. 4A through 4D, of a method of logging on by the apparatus manager when a difference in module configuration information is detected. If a difference in module configuration information is detected, a screen as shown in FIG. 4A is displayed, for example, on the operations panel 202 of the image forming apparatus 7. The apparatus manager can determine on this screen whether there has been any illegal modular change. If the change is legal so that the apparatus manager determines to authorize a startup, the apparatus manager presses a LOG ON AND AUTHORIZE button 401 in accordance with instructions shown on the screen. Then, a manager authentication screen shown in FIG. 4B is displayed. On this screen, the apparatus manager enters logon information. That is, the apparatus manager enters a logon name and a password in corresponding boxes 403 and 405, and presses a LOG ON button 407. If the apparatus manager is authenticated, a screen shown in FIG. 4C is displayed to notify the apparatus manager that the module configuration information has been properly updated. If there is no problem with this, the apparatus manager presses a CONTINUE button 409 to continue the startup operation of the image forming apparatus 7.

If a person (user) other than the apparatus manager enters logon information on the screen shown in FIG. 4B, a screen shown in FIG. 4D is displayed on the operations panel 202 of the image forming apparatus 7 so as to notify the user that the logon information is invalid and to prompt the user to be authenticated as the apparatus manager. Thus, in response to detection of a difference in module configuration information, a person (or a user) other than the apparatus manager is prevented from using the image forming apparatus 7. The authentication method may be, but is not limited to, the one that performs authentication on the operations panel 202 as in this case. For example, authentication methods using an external authentication device, such as IC card authentication and fingerprint authentication, may also be employed.

As described above, according to this embodiment, the image forming apparatus 7 is configured to compare the (current) configuration information of all the application and service modules with the (previous) configuration information of all the application and service modules stored in a nonvolatile storage medium at the time of a system startup, and if there is any difference between the two module configuration information items, to notify the apparatus manager of the difference. Accordingly, it is possible to detect an illegal modular change, so that it is possible to prevent information leakage due to reduced security.

Thus, an image forming apparatus according to one embodiment of the present invention is optimum as an image forming apparatus that is connected to a network and requires high security.

According to one embodiment of the present invention, there is provided an image forming apparatus including multiple application modules configured to perform image processing including scanning, printing, and copying of an image; multiple service modules configured to perform an image forming operation and to control the image forming apparatus; a nonvolatile configuration information storage part configured to contain first configuration information of the application modules and the service modules; a configuration information comparison part configured to read second configuration information of the application modules and the service modules and compare the first configuration information and the second configuration information before starting the application modules and the service modules; and a notification part configured to notify the manager of the image forming apparatus of the difference between the first configuration information and the second configuration information in response to detection of the difference.

According to one embodiment of the present invention, there is provided an image formation control method including storing first configuration information of multiple application modules configured to perform image processing including scanning, printing, and copying of an image and multiple service modules configured to perform an image forming operation and to control an image forming apparatus in a nonvolatile configuration information storage part; reading second configuration information of the application modules and the service modules and comparing the first configuration information and the second configuration information before starting the application modules and the service modules; and notifying the manager of the image forming apparatus of the difference between the first configuration information and the second configuration information in response to detection of the difference.

According to one embodiment of the present invention, there is provided a program causing a computer to execute the image formation control method as set forth above.

According to one embodiment of the present invention, there is provided a computer-readable recording medium having a program recorded thereon, the program causing a computer to execute the image formation control method as set forth above.

For example, referring to FIG. 1C, the program may be stored in the MEM-P 231 or MEM-C 232. The program may also be stored in the memory card 235.

Thus, according to one aspect of the present invention, it is possible to detect an illegal change in module configuration and thus to prevent a serious security vulnerability from being caused in an image forming apparatus. Further, it is possible to notify the manager of the image forming apparatus of a change in module configuration, so that it is possible to prevent information leakage due to vulnerability and thus to increase security.

The present invention is not limited to the specifically disclosed embodiment, and variations and modifications may be made without departing from the scope of the present invention.

The present application is based on Japanese Priority Patent Applications No. 2006-122125, filed on Apr. 26, 2006, and No. 2007-075193, filed on Mar. 22, 2007, the entire contents of which are hereby incorporated by reference.

What is claimed is:

1. An image forming apparatus, comprising:
a plurality of application modules configured to perform image processing including scanning, printing, and copying of an image;
a plurality of service modules configured to perform an image forming operation and to control the image forming apparatus, the plurality of service modules including at least a certificate control service (CCS) module for performing authentication, an operation control service (OCS) module for controlling an operation panel, and system control service (SCS) module for performing system control including controlling the CCS module and OCS module;
a nonvolatile configuration information storage part configured to contain first configuration information of the application modules and the service modules;
a configuration information comparison part configured to read second configuration information of the application modules and the service modules from the application modules and the service modules included in the image forming apparatus before starting the application modules and the service modules during a current startup operation of the image forming apparatus, and configured to compare the first configuration information and the second configuration information before starting the SCS module, the first configuration information being configuration information obtained during a previous startup operation of the image forming apparatus; and
a notification part configured to notify a user of the image forming apparatus of a difference between the first configuration information and the second configuration information in response to detection of the difference.

2. The image forming apparatus as claimed in claim 1, further comprising:
a start prevention part configured to prevent one or more of the modules having the difference from being started in response to the detection of the difference.

3. The image forming apparatus as claimed in claim 1, further comprising:
an authentication request part configured to request a manager to be authenticated in response to the detection of the difference.

4. The image forming apparatus as claimed in claim 1, further comprising:
a module start part configured to start only one or more modules necessary for authenticating a manager from among the service plurality of modules in response to the detection of the difference; the necessary modules including the CCS module, the OCS module and the SCS module.

5. The image forming apparatus as claimed in claim 1, further comprising:

a module configuration information update part configured to update the first configuration information contained in the configuration information storage part in response to authorization of the difference by a manager.

6. The image forming apparatus as claimed in claim 1, further comprising:
a start part configured to normally start a system of the image forming apparatus in response to authorization of the difference by a manager.

7. The image forming apparatus as claimed in claim 1, further comprising:
an authentication rejection and request part configured to reject a request for authentication from a user other than a manager and newly request the user to be authenticated.

8. The image forming apparatus as claimed in claim 1, further comprising:
a use prevention part configured to prevent a user other than a manager to use the image forming apparatus in response to the detection of the difference.

9. The image forming apparatus of claim 1, further comprising:
a module activation part configured to activate only a selected one of the service modules, the selected service module being a service module which is necessary to authenticate the user, in response to the detection of the difference; and
a request part configured to request the user to be authenticated using the activated one of the service modules and, if the user is successfully authenticated, to determine whether the authenticated user is a manager of the image forming apparatus, in response to the detection of the difference.

10. The image forming apparatus as claimed in claim 1, wherein the SCS module is started in a first mode if the difference between the first configuration information and the second configuration information is not detected as a result of comparing the first configuration information and the second configuration information by said configuration information comparison part, and the SCS module is started in a second mode different from the first mode if the difference between the first configuration information and the second configuration information is detected as a result of comparing the first configuration information and the second configuration information by said configuration information comparison part, the first mode causing all of the service modules including the SCS module to be started and the second mode causing only the SCS module, the OCS module, and the CCS module to be started among the service modules.

11. An image formation control method, comprising:
storing first configuration information of a plurality of application modules configured to perform image processing including scanning, printing, and copying of an image and a plurality of service modules configured to perform an image forming operation and to control an image forming apparatus in a nonvolatile configuration information storage part, the plurality of service modules including at least a certificate control service (CCS) module for performing authentication, an operation control service (OCS) module for controlling an operation panel, and system control service (SCS) module for performing system control including controlling the CCS and OCS;
reading second configuration information of the application modules and the service modules from the application modules and the service modules included in the image forming apparatus before starting the application modules and the service modules during a current startup operation of the image forming apparatus, and comparing the first configuration information and the second configuration information before starting the SCS module, the first configuration information being configuration information obtained during a previous startup operation of the image forming apparatus; and
notifying a user of the image forming apparatus of a difference between the first configuration information and the second configuration information in response to detection of the difference.

12. The image formation control method as claimed in claim 11, further comprising:
preventing one or more of the modules having the difference from being started in response to the detection of the difference.

13. The image formation control method as claimed in claim 11, further comprising:
requesting a manager to be authenticated in response to the detection of the difference.

14. The image formation control method as claimed in claim 11, further comprising:
starting only one or more of modules necessary for authenticating a manager from among the plurality of service modules in response to the detection of the difference, the necessary modules including the CCS module, the OCS module and the SCS module.

15. The image formation control method as claimed in claim 11, further comprising:
updating the first configuration information contained in the configuration information storage part in response to authorization of the difference by a manager.

16. The image formation control method as claimed in claim 11, further comprising:
normally starting a system of the image forming apparatus in response to authorization of the difference by a manager.

17. The image formation control method as claimed in claim 11, further comprising:
rejecting a request for authentication from a user other than a manager and newly requesting the user to be authenticated in response to the detection of the difference.

18. The image formation control method as claimed in claim 11, further comprising:
preventing a user other than a manager to use the image forming apparatus in response to the detection of the difference.

19. A non-transitory computer-readable recording medium having a program recorded thereon, the program causing a computer to execute the image formation control method as set forth in claim 11.

20. The image formation control method of claim 11, further comprising:
activating only a selected one of the service modules, the selected service module being a service module which is necessary to authenticate the user, in response to the detection of the difference; and
requesting the user to be authenticated using the activated one of the service modules and, if the user is successfully authenticated, determining whether the authenticated user is a manager of the image forming apparatus, in response to the detection of the difference.

21. The image formation control method as claimed in claim 11, further comprising:
starting the SCS module in a first mode if the difference between the first configuration information and the second configuration information is not detected as a result of comparing the first configuration and the second configuration information by said comparing, and starting the SCS module in a second mode different from the first mode if the difference between the first configuration information and the second configuration information is detected as a result of comparing the first configuration information and the second configuration information by said comparing, the first mode causing all of the service modules including the SCS module to be started and the second mode causing only the SCS module, the OCS module, and the CCS module to be started among the service modules.

* * * * *

UNITED STATES PATENT AND TRADEMARK OFFICE
CERTIFICATE OF CORRECTION

| | | |
|---|---|---|
| PATENT NO. | : 8,427,662 B2 | Page 1 of 1 |
| APPLICATION NO. | : 11/783982 | |
| DATED | : April 23, 2013 | |
| INVENTOR(S) | : Asakimori et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1421 days.

Signed and Sealed this
Ninth Day of December, 2014

Michelle K. Lee
*Deputy Director of the United States Patent and Trademark Office*